(12) United States Patent
Czaja et al.

(10) Patent No.: US 8,937,936 B2
(45) Date of Patent: Jan. 20, 2015

(54) ACQUIRING TIME SYNCHRONIZATION AND LOCATION INFORMATION WITH A FEMTOCELL

(75) Inventors: Stanislaw Czaja, Cardiff, CA (US); Paul Chun-Hsiung Wei, San Diego, CA (US); Sang Gook Kim, San Deigo, CA (US); Li-Hsiang Sun, San Deigo, CA (US)

(73) Assignee: Via Telecom Inc., San Diego, CA (US)

( * ) Notice: Subject to any disclaimer, the term of this patent is extended or adjusted under 35 U.S.C. 154(b) by 1084 days.

(21) Appl. No.: 12/463,798

(22) Filed: May 11, 2009

(65) Prior Publication Data

US 2009/0298515 A1  Dec. 3, 2009

Related U.S. Application Data

(63) Continuation-in-part of application No. 12/143,924, filed on Jun. 23, 2008, now Pat. No. 8,213,391.

(60) Provisional application No. 61/081,368, filed on Jul. 16, 2008, provisional application No. 60/977,653, filed on Oct. 5, 2007.

(51) Int. Cl.
| | |
|---|---|
| *H04W 24/00* | (2009.01) |
| *H04W 56/00* | (2009.01) |
| *H04L 7/04* | (2006.01) |

(Continued)

(52) U.S. Cl.
CPC .............. *H04L 7/041* (2013.01); *H04W 24/02* (2013.01); *H04W 56/00* (2013.01); *H04W 64/003* (2013.01); *H04W 84/045* (2013.01)
USPC ........................................................ 370/350

(58) Field of Classification Search
USPC ........................................ 455/456.5; 370/350
See application file for complete search history.

(56) References Cited

U.S. PATENT DOCUMENTS

| 5,508,708 A | 4/1996 | Ghosh et al. |
| 5,920,554 A | 7/1999 | Nakamura et al. |

(Continued)

FOREIGN PATENT DOCUMENTS

| CN | 1229563 | 9/1999 |
| CN | 1783822 | 6/2006 |

(Continued)

OTHER PUBLICATIONS

NPL document, 3GPP2 C.S0022-0, Position Determination Service Standard for Dual Mode Spread Spectrum Systems, Version 3.0, Feb. 16, 2001.*

(Continued)

*Primary Examiner* — Chirag Shah
*Assistant Examiner* — Majid Esmaeilian
(74) *Attorney, Agent, or Firm* — Richard K. Huffman; James W. Huffman

(57) ABSTRACT

A method for acquiring time synchronization and location information with a Femtocell includes an access point base station conveying an activation request to a service provider through a wired connection, where the service provider provides wireless communication in a macro area, and where the access point base station provides wireless communication in a local area. The method also includes the access point base station performing a first plurality of procedures to acquire a time synchronization and a second plurality of procedures to acquire a location of the access point base station.

22 Claims, 7 Drawing Sheets

(51) Int. Cl.
*H04W 24/02* (2009.01)
*H04W 64/00* (2009.01)
*H04W 84/04* (2009.01)

(56) References Cited

U.S. PATENT DOCUMENTS

| | | | |
|---|---|---|---|
| 6,049,596 A | 4/2000 | Dumaine et al. | |
| 6,141,565 A | 10/2000 | Feuerstein et al. | |
| 6,246,673 B1 | 6/2001 | Tiedemann, Jr. et al. | |
| 6,526,039 B1 * | 2/2003 | Dahlman et al. | 370/350 |
| 6,711,149 B1 | 3/2004 | Yano et al. | |
| 6,775,318 B2 | 8/2004 | Chen et al. | |
| 6,829,534 B2 | 12/2004 | Fuchs et al. | |
| 6,907,254 B1 | 6/2005 | Westfield | |
| RE38,808 E | 10/2005 | Schuchman et al. | |
| 6,975,988 B1 | 12/2005 | Roth et al. | |
| 7,064,709 B1 | 6/2006 | Weisenburger et al. | |
| 7,289,473 B1 | 10/2007 | Padovani et al. | |
| 7,388,838 B2 | 6/2008 | Abraham et al. | |
| 7,423,994 B2 | 9/2008 | Liu et al. | |
| 7,500,119 B2 | 3/2009 | Tsai | |
| 7,509,124 B2 | 3/2009 | O'Neil | |
| 7,551,930 B2 | 6/2009 | Lempio et al. | |
| 7,564,485 B2 | 7/2009 | Nath et al. | |
| 7,613,444 B2 | 11/2009 | Lindqvist et al. | |
| 7,664,492 B1 | 2/2010 | Lee et al. | |
| 7,756,531 B2 | 7/2010 | Aminzadeh | |
| 7,768,983 B2 | 8/2010 | Nylander et al. | |
| 7,817,997 B2 | 10/2010 | Nylander et al. | |
| 7,830,847 B1 | 11/2010 | Sill et al. | |
| 8,089,400 B1 | 1/2012 | Fang et al. | |
| 2002/0049058 A1 | 4/2002 | Tee | |
| 2002/0187792 A1 | 12/2002 | Kato et al. | |
| 2003/0202564 A1 | 10/2003 | Ho et al. | |
| 2004/0057468 A1 | 3/2004 | Shieh et al. | |
| 2004/0165528 A1 | 8/2004 | Li et al. | |
| 2004/0170221 A1 | 9/2004 | Storm et al. | |
| 2004/0185863 A1 | 9/2004 | Ogami | |
| 2004/0205158 A1 | 10/2004 | Hsu | |
| 2005/0026616 A1 | 2/2005 | Cavalli et al. | |
| 2005/0192024 A1 | 9/2005 | Sheynblat | |
| 2005/0282559 A1 | 12/2005 | Erskine et al. | |
| 2006/0166671 A1 | 7/2006 | Rajkotia et al. | |
| 2006/0274743 A1 | 12/2006 | Yegin et al. | |
| 2006/0276201 A1 | 12/2006 | Dupray | |
| 2007/0105568 A1 | 5/2007 | Nylander et al. | |
| 2007/0183427 A1 | 8/2007 | Nylander et al. | |
| 2007/0222676 A1 * | 9/2007 | Uchida | 342/357.12 |
| 2007/0258395 A1 | 11/2007 | Jollota et al. | |
| 2008/0076392 A1 | 3/2008 | Khetawat et al. | |
| 2008/0076398 A1 | 3/2008 | Mate et al. | |
| 2008/0096527 A1 * | 4/2008 | Lamba et al. | 455/411 |
| 2008/0130596 A1 | 6/2008 | Kalhan | |
| 2008/0188265 A1 | 8/2008 | Carter et al. | |
| 2008/0244148 A1 * | 10/2008 | Nix et al. | 710/313 |
| 2008/0287153 A1 | 11/2008 | Fullam | |
| 2009/0029645 A1 | 1/2009 | Leroudier | |
| 2009/0034482 A1 | 2/2009 | Hahm et al. | |
| 2009/0042536 A1 | 2/2009 | Bernard et al. | |
| 2009/0052395 A1 | 2/2009 | Bao et al. | |
| 2009/0061892 A1 | 3/2009 | Lee et al. | |
| 2009/0082010 A1 | 3/2009 | Lee et al. | |
| 2009/0092078 A1 | 4/2009 | Czaja et al. | |
| 2009/0092096 A1 | 4/2009 | Czaja et al. | |
| 2009/0092097 A1 | 4/2009 | Nylander et al. | |
| 2009/0092122 A1 | 4/2009 | Czaja et al. | |
| 2009/0093246 A1 | 4/2009 | Czaja et al. | |
| 2009/0093252 A1 | 4/2009 | Czaja et al. | |
| 2009/0098873 A1 | 4/2009 | Gogic | |
| 2009/0135758 A1 | 5/2009 | Alper et al. | |
| 2009/0290502 A1 * | 11/2009 | Tinnakornsrisuphap et al. | 370/252 |
| 2009/0298475 A1 | 12/2009 | Czaja et al. | |
| 2010/0184421 A1 | 7/2010 | Lindqvist et al. | |

FOREIGN PATENT DOCUMENTS

| | | |
|---|---|---|
| CN | 1894979 A | 1/2007 |
| WO | WO2007016499 | 2/2007 |

OTHER PUBLICATIONS

NPL document "WO 2008/051124 A1", to Vikberg et al. (hereinafter Vikberg).*

Claussen, Holger et al. "Performance of Macro- and Co-Channel Femtocells in a Hierarchical Cell Structure." The 185h Annual IEEE International Symposium on Personal,. Indoor and Mobile Radio Communications (PIMRC'07) . 2007 IEEE pp. 1-5.

* cited by examiner

ACQUIRING TIME SYNCHRONIZATION AND LOCATION INFORMATION WITH A FEMTOCELL

PRIORITY INFORMATION

This application claims benefit of priority of U.S. provisional application: Ser. No. 61/081,368 titled "Femto Position and Time Acquisition" filed Sep. 21, 2008, whose inventors are Stanislaw Czaja and Paul Chun-Hsiung Wei; which is hereby incorporated by reference in its entirety as though fully and completely set forth herein. This application is a Continuation-In-Part of U.S. patent application Ser. No. 12/143,924 titled "TIME SYNCHRONIZATION OF FEMTOCELL" filed Jun. 23, 2008, which claimed priority from U.S. provisional application Ser. No. 60/977,653 filed Oct. 5, 2007, which are hereby incorporated by reference in their entirety as though fully and completely set forth herein.

FIELD OF THE INVENTION

The present invention relates to the field of cellular networks, and more particularly to automatic provisioning of a femtocell base station.

DESCRIPTION OF THE RELATED ART

In recent years, the use of mobile devices and, in particular, cellular telephones has proliferated. As a result, focus on reception for cellular telephones or other mobile devices, especially in homes or primary residences, has increased. Additionally, typical users of mobile devices use or subscribe to data services for their homes. As a result, femtocells (more generally called access point base stations) have begun to be used in the home. Femtocells provide cellular service to mobile devices using the data service of the user. Thus, these femtocells provide excellent service where mobile devices are used most and typically make use of data plan services (e.g., DSL, fiber optic, cable, WiMAX, etc.), which may not require a nearby macro cell of the cell phone service provider. However, femtocells typically require manual set up, e.g., by a technician, in order to operate efficiently. Thus, improvements in installation of femtocells would be desirable.

SUMMARY OF THE INVENTION

Various embodiments of a system and method for acquiring time synchronization and location information with a Femtocell are disclosed. In one embodiment, a method includes an access point base station conveying an activation request to a service provider through a wired connection, where the service provider provides wireless communication in a macro area, and where the access point base station provides wireless communication in a local area. The method also includes the access point base station performing a first plurality of procedures to acquire a time synchronization and performing a second plurality of procedures to acquire a location of the access point base station. The method further includes the access point base station conveying the acquired location to the service provider.

In another embodiment, a femtocell includes at least one wireless port for providing bi-directional communication with one or more access terminals, where the at least one wireless port is usable in providing wireless communication in a local area. The femtocell also includes a first port for providing bi-directional communication with a service provider over an IP network. The femtocell further includes a processor coupled to the at least one wireless port and the first port, and a memory medium coupled to the processor. The memory medium may include program instructions executable to convey an activation request to a service provider through a wired connection. The program instructions may also be executable to perform a first plurality of procedures to acquire a time synchronization and to perform a second plurality of procedures to acquire a location of the access point base station. The program instructions may be further executable to convey the acquired location to the service provider.

BRIEF DESCRIPTION OF THE DRAWINGS

A better understanding of the present invention can be obtained when the following detailed description of the preferred embodiment is considered in conjunction with the following drawings, in which.

Figure 1:
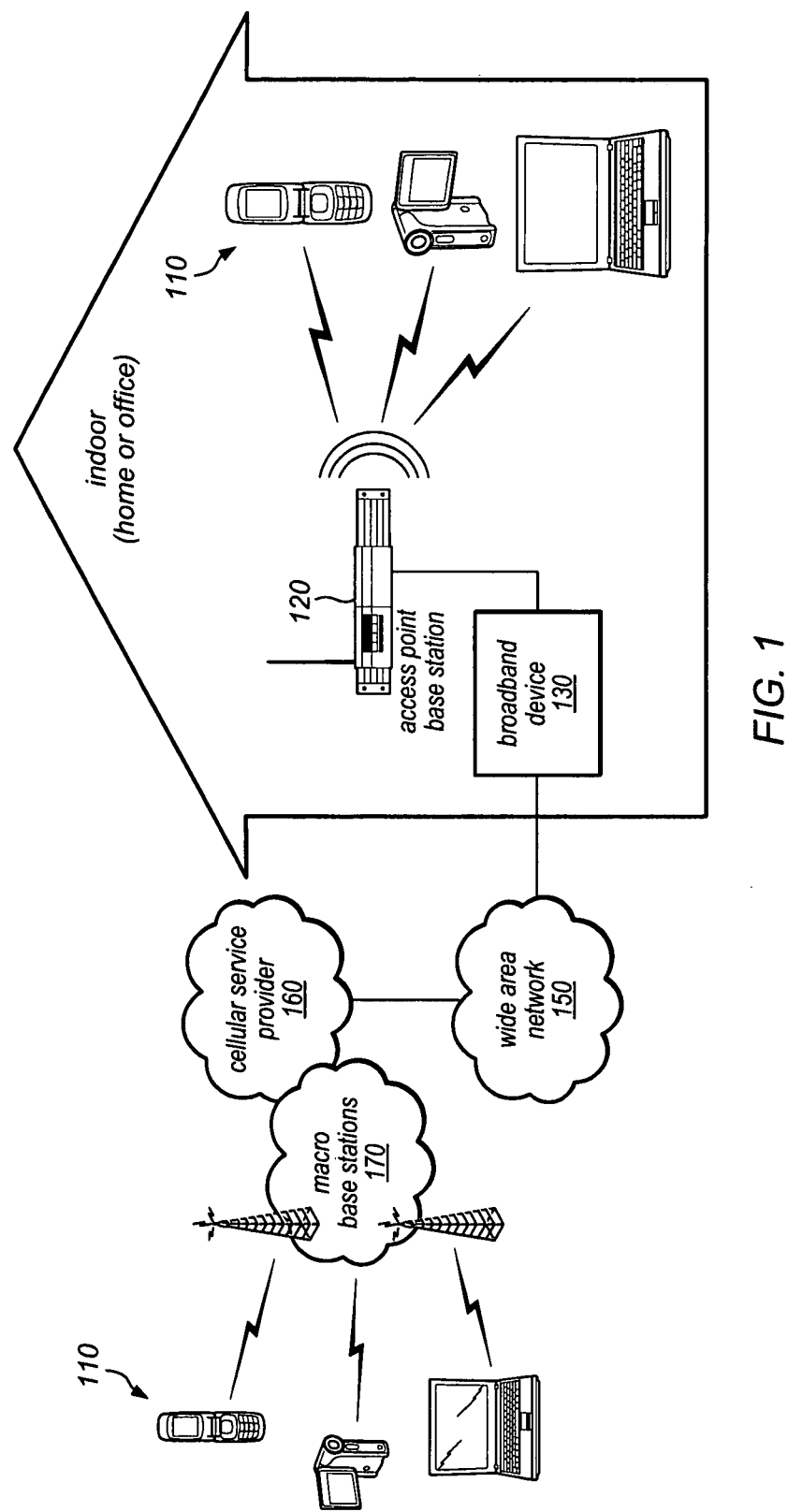
FIG. 1 is an exemplary system including an access point base station according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 2:
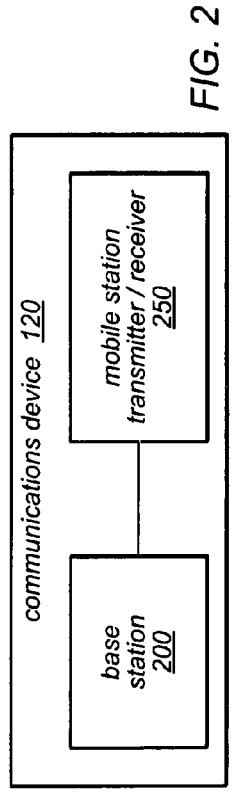
FIG. 2 is an exemplary general block diagram of the access point base station according to one embodiment.

FIGS. 1 and 2—Exemplary Block Diagrams of a Communications System

FIG. 1 illustrates an exemplary system including an access point base station (e.g., a femtocell). The term "access point base station" is intended to include typical definitions (as known by those of skill in the art) of femtocells, home base stations, personal access points (PAPs), and personal 2G-4G (or nG) base stations, among others. In some embodiments, the access point base station may include capabilities of a mobile station transmitter/receiver (transceiver) as well as further functionality described in more detail below. Various embodiments of a method to automatically provision (i.e., setup) the access point base station (e.g., by providing appropriate operational parameters) are presented below.

As shown, FIG. 1 illustrates a home which may include one or more mobile devices 110, an access point base station 120, and a broadband device 130. As shown in FIG. 2, the access point base station 120 may include base station circuitry 200 which may be coupled to mobile station transceiver circuitry 250. The base station circuitry 200 and/or the mobile station transceiver circuitry 250 may include or be coupled to a processor and memory to implement their functionality. In one embodiment, each of the base station circuitry and the mobile station transceiver circuitry may have independent processors and memory; however, these components may share a processor and memory.

As shown in FIGS. 1 and 2, the base station circuitry 200 and the mobile transceiver circuitry 250 may be included in a same housing of the access point base station 120. The housing may be plastic or metal (e.g., aluminum or other metals) and may take a box-like design. In one embodiment, the housing may include one or more lights or light emitting diodes (LEDs) which indicate the activity or operation of various components of the access point base station 120 (e.g., operation of the base station circuitry 200 and/or the mobile station transceiver circuitry 250, among others).

The housing may include a power supply for providing power to the components of the access point base station 120. The housing may also include one or more ports for coupling to other devices or communications devices. For example, in one embodiment, the housing may include a universal serial bus (USB) port (or other type of port, such as firewire, among others) for attaching devices (e.g., printers, personal music players, personal digital assistants, cell phones, external hard drives, testing devices, media controllers, etc.). Additionally, or alternatively, the one or more ports may include Ethernet ports (e.g., for coupling to a router or the communications device 130, among others), fiber ports, cable ports, etc.

The access point base station 120 may operate to receive wireless communication (e.g., radio frequency (RF) communication) from the one or more mobile devices 110 and provide corresponding signals or communication with mobile operator(s) (or cellular service providers) corresponding to the providers of the mobile devices 110. More specifically, the access point base station 120 may operate to provide communication for the mobile devices 110 using the broadband communications device 130 over an IP wide area network 150 (e.g., the Internet, via the user's internet service provider (ISP)). The broadband device 130 may thus communicate with the cellular service provider 160 via the Internet.

Moreover, the IP wide area network 150 may be private or dedicated to the user using various technologies, for example, lease line, frame relay, digital subscriber line (DSL), or dial-up service. The IP communication may be encrypted or IP tunneling may be used if supported by the IP wide area network 150. The cellular service provider 160 may also be coupled to macro base stations 170 (sometimes referred to as cell phone towers or macro cell stations) which may operate to provide service to the mobile devices 110 when outside of range of the access point base station 120 and/or when the access point base station 120 is disabled or non-operational. Thus, the access point base station 120 may provide bi-directional communication for the mobile devices via an IP network such as the Internet. Stated another way, users in the home may use their cell phones which communicate with the access point base station, wherein the user's voice communications may be transmitted/received to/from the cellular service provider over an IP network.

The mobile station transceiver circuitry 250 may operate to communicate with the mobile devices 110 and the cell towers 170 using wireless cellular communication such as RF. However, it should be noted that in some embodiments, the mobile station transceiver circuitry 250 may not communicate directly with the mobile devices 110; instead, it may receive signals from the mobile devices 110 via another component, such as the base station 200. The mobile station transceiver circuitry 250 may be used for loopback testing, reporting of environmental factors, and to provide redundancy when the IP network is down, thus improving cellular reception in the home. Thus, in some embodiments, the mobile station transceiver circuitry 250 may be used to monitor environmental factors of the access point base station 120 (e.g., neighboring macro cell stations, neighboring femtocells, radio frequency traffic in the home, etc.) and may convey that information (e.g., to the service provider via the macro cell station or the IP network, as desired) for configuration of the access point base station 120. This information may be critical during initial (e.g., automatic) set up of the access point base station 120. Correspondingly, macro base station 170 and/or the service provider 160 via the wide area network 150 may communicate with the access point base station 120 during installation of the access point base station 120 to perform set-up operations, e.g., automatically. The mobile station transceiver circuitry 250 may also allow for initiation of testing (e.g., loop-back testing) of the access point base station 120, e.g., in response to signals from the macro base station 170.

The mobile devices (also referred to as access terminals) 110 may include any type of device which may be used in a cellular network, e.g., RF communication. Mobile devices 110 may include cellular (or cell) phones (including smart phones), personal digital assistants (PDAs) with mobile communication capabilities, laptops or computer systems with mobile communication components, and/or any device that is operable to communicate with a cellular network. The mobile devices may use various different protocols, e.g., CDMA2000 (1xRTT and EV-DO), UMB, UMTS, LTE, WiMax, or others). Thus, the access point base station may support any or at least a subset of the protocols used by the mobile devices 110, e.g., without modification to the standards or protocols for supporting existing mobile devices.

The broadband device 130 may include a router and/or cable/DSL modem for connecting to the ISP 150. In one embodiment, the broadband device 130 may include a wireless router (or one or more wireless hubs) which may provide wireless communication (e.g., using 802.11x communication technology) for the communications device 120. Additionally, the broadband device 130 may be connected to the wide area network 150 via wired (e.g., cable, DSL, fiberoptic, power lines, etc.) or wireless means (e.g., WiMAX or other wireless communication methods), as desired. Alternatively, or additionally, the broadband device 130 may be coupled to the access point base station 120 remotely, e.g., via a WiMAX wireless connection. Furthermore, in one embodiment, the access point base station 120 may include the broadband device 130 (e.g., in an all-in-one solution for the user).

Thus, the access point base station 120 may provide access to the cellular network via the wide area network 150 (e.g., the Internet) using the broadband device 130 (wired or wirelessly) and may include the mobile station transceiver 250.

Figure 3:
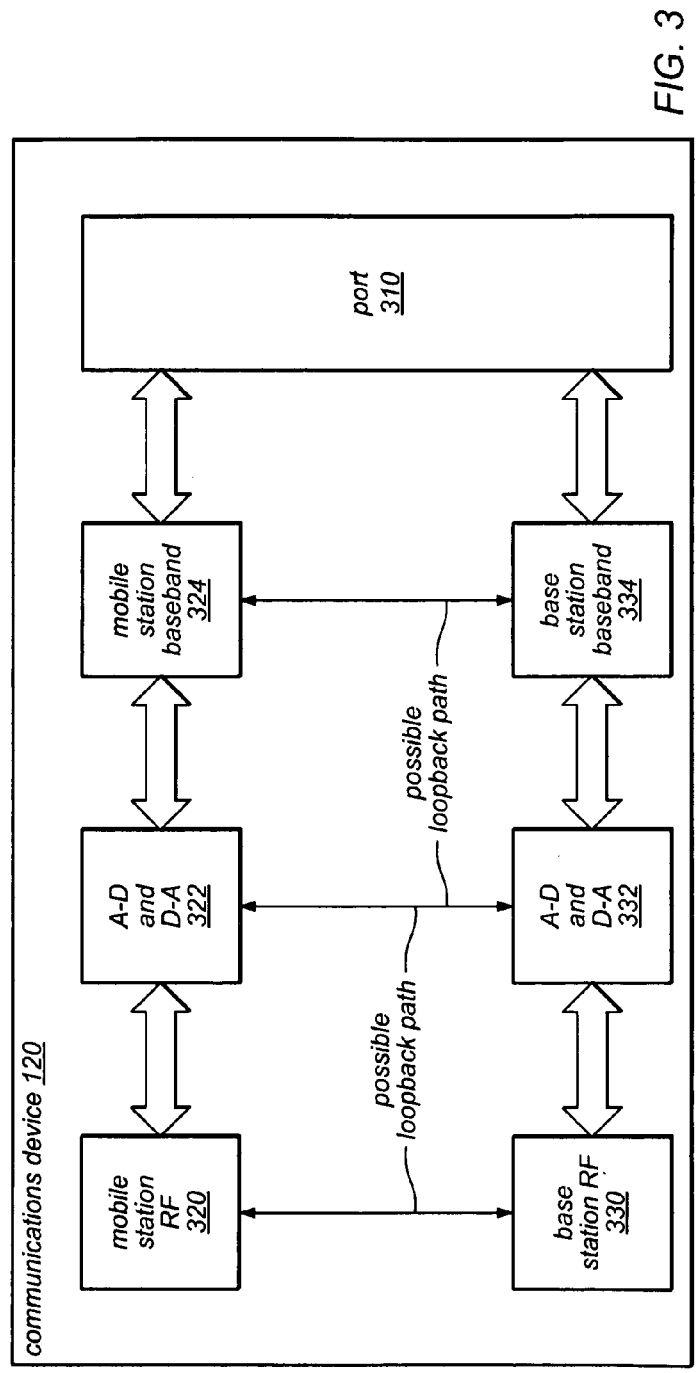
FIG. 3 is an exemplary block diagram of the access point base station according to one embodiment.

FIG. 3—Exemplary Block Diagram of the Access Point Base Station

FIG. 3 illustrates an exemplary block diagram of the access point base station 120. As shown, the access point base station 120 may include a port 310 (or method of access) to reach the wide area network 150, possibly provided by the broadband communications device 130. As indicated above, the port 310 may provide for wired or wireless communication with the broadband communications device 130. In some embodiments, the port 310 may be implemented as an interface or an interconnection network coupled to the broadband communications device 130, base station circuitry 200, and/or mobile station transceiver circuitry 250. A mobile station baseband 324 and base station baseband 334 may be coupled to the port 310. Each baseband component may be in turn connected to analog to digital and digital to analog converters (322 and 332 respectively) which may be connected to respective transceivers (mobile station R/F 320 and base station R/F 330). Various ones of these components may be coupled for loop-back testing (e.g., the mobile station R/F 320 to base station R/F 330, the two digital/analog converters 322 and 322, and/or the two baseband components 324 and 334, among other possible connections). Note that this block diagram is exemplary only and that various ones of the blocks may be replaced, modified, or connected in different manners, as desired. Further note that additional components may be present in the access point base station 120 that are not shown in FIG. 3.

Figure 4:
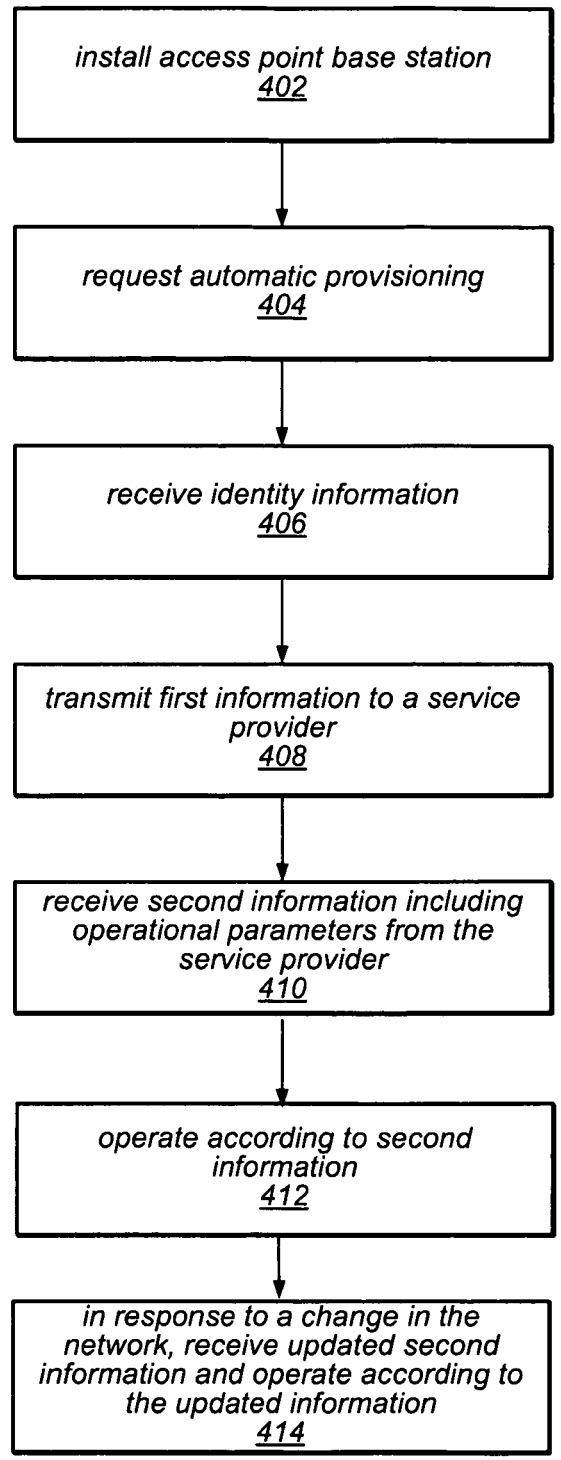
FIG. 4 is a flowchart of an exemplary method for automatically provisioning the access point base station, according to one embodiment.

FIG. 4—Automatic Provisioning of an Access Point Base Station

FIG. 4 illustrates an exemplary method for automatically provisioning an access point base station. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows. In the following description, references to the "access point base station" refer to the access point base station 120.

In 402, the access point base station may be installed, e.g., by a user, possibly in a home. However, installation may occur by a service provider technician or other entity, as desired. Installation of the access point base station may include providing power to the access point base station and coupling the access point base station to a broadband communications device (e.g., using wired or wireless means). In some embodiments, the user may only be required to provide power to the access point base station and couple the access point base station to the broadband device. In other embodiments, further connection settings may be required (e.g., to set up the wireless or network settings of the access point base station). Furthermore, in some embodiments, the access point base station may be installed in a new location by moving the access point base station from an old location. In this example, one or more of the steps described below may not be performed if such information has already been received from a previous installation (e.g., acquiring identification information as in 406).

Figure 5:
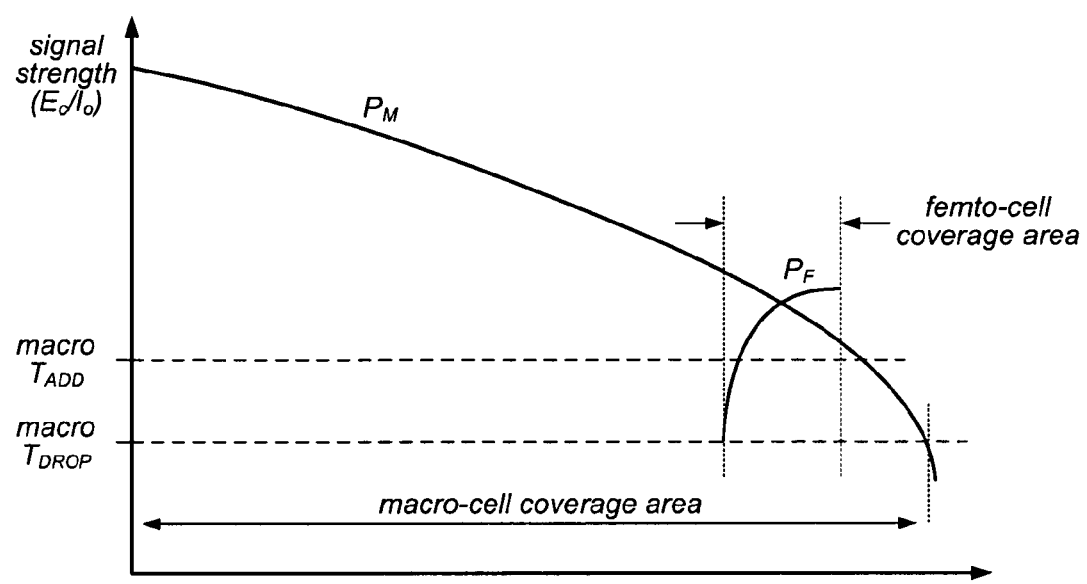
FIG. 5 is a graph illustrating handoff areas for a macro base station and an access point base station, according to one embodiment.

The access point base station may be installed within or near a macro area of a macro cell base station which provides wireless communication in the macro area for the service provider. Thus, the access point base station may provide wireless communication for the service provider within a local area, possibly inside of or overlapping with the macro area provided by the macro base station. FIG. 5 shows a graph corresponding to this scenario. As shown, the access point base station coverage area (corresponding to the access point base station described herein) is within the macro base station coverage area. The indicated region illustrates where handoffs between the access point base station and the macro base station may occur, e.g., based on signal strength ratios. Further descriptions of the handoff procedures are provided below.

Figure 6:
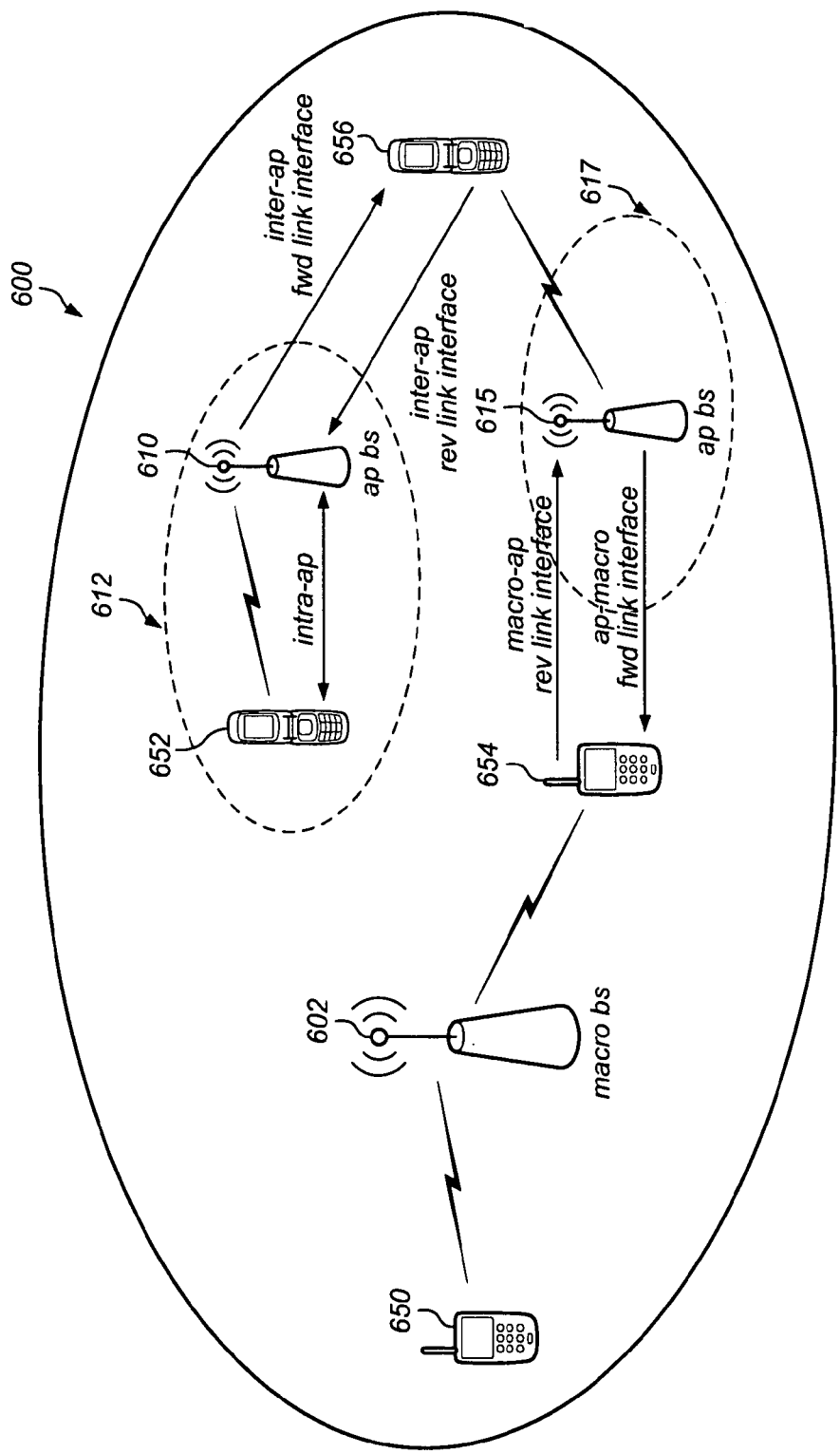
FIG. 6 is a diagram illustrating service areas for a macro base station and two access point base stations, according to one embodiment.

FIG. 6 also illustrates a macro base station 602 which provides service in a macro area 600 to access terminals within the macro area (such as, for example, access terminal 650). As shown, two access point base stations 610 and 615 may provide service in local areas 612 and 617. More specifically, access point base station (ap bs) 610 may provide service for access terminal 652. As also indicated, there may be macro-ap reverse and forward link interference for access terminal 654 between the macro base station 602 and the access point base station 615 as well as inter-ap forward and reverse link interference for access terminal 656 between the access point base stations 610 and 615. These interferences may be mitigated or managed according to various power, handoff, and hysterises parameters, described in more detail below.

In 404, the access point base station may send a message or otherwise request automatic provisioning of the access point base station from a wireless service provider. The message (and possibly other messages described below) may be defined as a new set of classes in the SNMP (Simple Network Management Protocol), CORBA (Common Object Requesting Broker Architecture ), and XML (Extensible Markup Language) models and may be administered over network management protocols, such as OAM (Operating Administrative and Maintenance), among other possibilities. In some embodiments, the access point base station may send the message over an IP network, e.g., provided by the broadband communications device. Alternatively (or possibly if the broadband communications device is not currently providing a network connection), the access point base station may send the message over the wireless network of the service provider, e.g., using a neighboring macrocell base station or possibly another access point base station.

In 406, the access point base station may receive identity information from the service provider. The identity information may uniquely identify the access point base station in the network of the service provider, and may be used in requests between the service provider and the access point base station.

In 408, the access point base station may transmit first information to the service provider, e.g., in one or more messages, possibly including an activation request message (ARM). The first information may be primarily provided over the IP network, e.g., provided by the broadband communications device. However, similar to descriptions above, the first information may be provided via the macro base station of the service provider, e.g., when the IP network is unavailable. The first information may include identity information and/or a plurality of parameters which describe various aspects of the access point base station. For example, the plurality of parameters may indicate location information, environmental information, capability information, and/or other information related to the access point base station.

More specifically, the first information may include the location of the access point base station, e.g., in terms of latitude and longitude, among other possibilities. The location information may be determined by the service provider and/or the access point base station, e.g., using standard network assisted location procedures. In some embodiments, the access point base station may determine its location information by communicating with a neighboring macro base station (or a plurality of neighboring base stations), e.g., by determining offset information and the location of the neighboring base station(s). Alternatively, in one embodiment, a GPS receiver may be used to provide the location information (e.g., coupled to or comprised in the access point base station).

As indicated above, the first information may further include capability information such as supported RAT (radio access technology) technologies, maximum number of users and data rates, cell coverage characteristics (e.g., to allow maximum power allocation), etc. The capability information may include propagation characteristics of the environment in which the access point based station is located; however, this information may also or instead be provided in the environmental information parameters. One or more portions of the first information (e.g., environmental characteristics, location information, offset information, etc.) may be determined using a mobile station transceiver of the access point base station.

In some embodiments, the first information may include a preferred terminal list. The preferred terminal list may be used to determine whether access terminals can use the access point base station or for assigning priority of access terminals for use of the access point base station. In some embodiments, the user may provide input (e.g., to a user interface of the access point base station) for specifying the access terminals of the preferred terminal list. Alternatively, or additionally, users may enter in a secret code, e.g., using their access terminal as an input device, to use (or get priority use of) the access point base station. In some embodiments, the owner or administrator of the access point base station may define a priority (e.g., using tiered rankings, explicit ordering, or other methods) among the access terminals in the list to define how the access point base station allots resources to those access terminals on the list. However, it should be noted that the preferred terminal list may not be provided by the access point base station during provisioning of the access point base station. For example, the preferred terminal list may be updated or provided by the access point base station at any time after provisioning, as desired.

Similarly, the first information may include an access policy (or desired access policy). For example, the user may provide input of a desired access policy of the access point base station. In some embodiments, the access policy may have one or more of the following options: open (e.g., where all access terminals may access the access point base station), restricted (e.g., where all access terminals in the access terminal list are permitted unrestricted access where other access terminals have limited or no access), and/or private (e.g., where only access terminals on the access terminal list are allowed to use the access point base station). Similar to above, this information may or may not be provided during provisioning and may be provided or changed at any later point as desired. However, in some embodiments, the user may not be able to control the access policy of the access point base station; instead the service provider may ultimately assign the policy. Thus, various types of information may be provided to the service provider in the first information.

In 410, the access point base station may receive second information from the service provider (e.g., over the IP network) which includes information and/or one or more operational parameters. In 410 the access point base station may receive the second information (including the operational parameters) and store the operational parameters in the appropriate memory location in the base station such that these parameters may be accessed and used by software executing on the base station. Thus, receipt and storage of the operational parameters may automatically provision or configure the access point base station without any direct or manual user input required (other than connecting the base station to power and a broadband connection).

The second information may be determined (by the service provider) based on the first information (e.g., measurement information, location information, and/or other information) provided by the access point base station. The operational parameters may include hand off parameters for handling handoffs of access terminals between the access point base station and the macro cell base station. In one embodiment, the second information may include an access point base station frequency or channel(s) assignment, a network SID and/or NID, and/or the identification of the access point base station, among others. The second information may include a PN offset (for CDMA2000 protocols) and/or a cell scrambling code (for UMTS). The PN offset and/or cell scrambling code may be based on the location of the access point base station and may be used to manage the interference of the access point base station to the surrounding network.

The second information may include a neighbor list, which may include a list of neighboring macro base stations and/or other access point base stations. As indicated above, the second information may include PN offsets (e.g., long and/or short PN offsets) or scrambling code(s) for UMTS. These may be used to aid in the interference management of the access point base station. In some embodiments, the neighbor list may be updated whenever the neighbor list changes and/or at various periodic time intervals. The second information may include a maximum (transmit) power parameter which may be used to control the interference of the access point base station to the surrounding network (e.g., macro base stations or other access point base stations which may be indicated in the neighbor list). The maximum power parameter(s) may be determined based on the desired coverage area of the access point base station as well as the desired quality of service (e.g., for the user's home). The power parameter(s) may also be determined based on household propagation models, measurements of signals of the access point base station's neighboring base stations (macro or otherwise), and/or other factors. Additional parameters may include overhead channels power allocation (e.g., PiCH for the 1xRTT), etc.

The second information may further include an admission policy mode, which, as indicated above, may allow for open, restricted, or private access to the access point base station resources. Furthermore, the second information may include a preferred terminal list, which, as also indicated above, may be used to manage service priority for access terminals. For example, in a private mode, the access point base station may restrict access only to those access terminals on the list, where for a semi-open policy, the listed access terminals may be given service priority. The admission policy and/or preferred terminal list may be determined based on the owner's service agreement, the location of the access point base station, the subscriptions of other customers near the location of the access point base station, the admission policy and/or a preferred terminal list provided by the access point base station (e.g., as provided by the user), the neighbor list, and/or other information.

The second information may further include handoff offsets or parameters related to handoffs, which may indicate macro to access point base station drop threshold(s) and/or access point base station to macro drop threshold(s). For example, the second information may provide handoff (HO) thresholds and hysteresis information, e.g., to facilitate handoff regardless of the access point base station within the macro coverage area.

The handoff (HO) thresholds may comprise handoff parameters, such as macro to access point base station (or femto) drop threshold "M2FTdrop" and access point base station to macro drop threshold "F2MTdrop", among others. The M2FTdrop parameter may specify a signal strength ratio used to determine when to perform a handoff from the macro base station to the access point base station when an access terminal is moving from the macro area (service being provided by the macro base station) to the local area. Conversely, the F2MTdrop parameter may specify a signal strength ratio used to determine when to perform a handoff from the access point base station to the macro base station when an access terminal is moving from the local area (service being provided by the access point base station) to the macro area.

The hysteresis information may comprise one or more parameters that indicate a history of which of the macro base station or the access point base station has most recently provided service to the access terminal. In one embodiment, a positive (e.g., in dB) value of M2FTdrop parameter provides a hysteresis during the macro-to-femto HO, while a negative value of F2MTdrop provides hysteresis during the femto-to-macro HO. That hysteresis may protect against frequent switching (ping-pong), between macro and femto service.

In one embodiment, the parameters may relate to optimal HO completion time or thresholds related to the time of HO completion. The HO parameters may help secure seamless HOs to/from other base stations, help reduce interference to the remaining users and/or surrounding network, and/or improve system capacity and overall quality of service by reducing the number of active code channels. These operational parameters/information (and possibly other parameters) may be semi-static and valid until the next message is sent from the service provider and/or until other changes in the location, environment, and/or user settings (among others) of the access point base station. Further descriptions regarding handoffs between the access point base station and a neighboring base station are provided in further flowcharts below.

The second information may further include additional parameters such as access point base station time re-sync (which may be sent by the network upon a loss of link(s) of the access point base station with the neighbor network), channels assignments (CAM messages which may be used to aid in the interference mitigation management of the access point base station). In some embodiments, the second information (and more particularly the operational parameters) may be determined using a coverage area propagation model. For example, this determination among others of the information and operational parameters may be performed or determined by one or more servers of the service provider.

The coverage area propagation model may include a series of typical residence/office layouts including such parameters as: type—destand alone/attached/apartment; area, number of rooms and levels; construction type—concrete, wood, cardboard, etc. Those typical layouts may be included in an installation SW (disc). Various procedures and the parameters (area, construction type, etc) may be entered by the user (or detected or located in a database), e.g., upon installation of the femtocell, and then sent in a message (such as the ARM message described herein) to the service provider. When the message is received, that information may be mapped into propagation models maintained by the service provider to derive, for example, the AP maximum transmit power. The variance between the typical and the actual residence layout and the actual location of the AT within the residence may be covered by the range of M2FTdrop and F2MTdrop parameters.

In 412, the access point base station may operate based on the second information, e.g., the one or more operational parameters of the second information. Operating according to the parameters may provide reduced interference caused by the access point base station (e.g., in the operation of neighboring macro or femto cells), and may allow for efficient handoffs between the access point base station and other base stations in the area (further descriptions provided below). Thus, the access point base station may be automatically configured or provisioned without requiring the user to manually configure the access point base station, which typically requires a level of expertise greater than that of average users.

In 414, in response to a change in the network, the access point base station may receive updated operational parameters from the service provider (e.g., automatically). Changes may include addition or removal of access point base stations, increases or decreases in load in the network (e.g., causing the service provider to change various parameters to perform load balancing in the area), changes in environmental conditions, detection of certain types of packages or messages in the network, loss or decrease of power to various base stations, and/or any other changes which may affect the parameters of the access point base station.

In some embodiments, the change may be initially determined by the access point base station and reported to the service provider before receiving the updated operational parameters. However, in some embodiments, the service provider may provide the updated parameters without first receiving a message from the access point base station. For example, as indicated above, a new access point base station may have been added to the area, and in response to provisioning of the new access point base station, operational parameters of the access point base station may need to be changed, e.g., as determined by the service provider. Accordingly, the access point base station may operate based on the updated operational parameters, which may reduce interference caused by the access point base station in the changed network. The updated parameters may also allow for more efficient handoffs in the changed network.

Additionally, during operation, all overhead messages (such as PCH, etc.) may be rebroadcast in the coverage area to provide reliable delivery of pages during Idle HO. Furthermore, each time a new user and/or a new resource is added to the existing users (e.g., defined with the Channel Assignments Messages), the assignment may be indicated (e.g., sent over the OAM interface or over the air) to the access point base station to aid in interference mitigation.

Note that various ones of the method elements described above (more specifically, 404, 406, 408, 410, and/or 412) may be performed automatically. As used herein, the term "automatically" is used to mean that the actions are not performed by a user. For example, in the descriptions above, a user may simply instruct the access point base station to begin a provisioning procedure to set up the access point base station and the method elements described above may be performed without any further user input specifying the steps. Alternatively, the access point base station may automatically begin the set up as soon as the access point base station is installed or otherwise coupled to the wide area network (e.g., the Internet). Thus, in this embodiment, the user may not provide any input during the provisioning of the access point base station. However, it should be noted that there may be embodiments where user input is required or requested during the automatic process (e.g., confirmation of steps or requests for certain user parameters).

Figure 7:
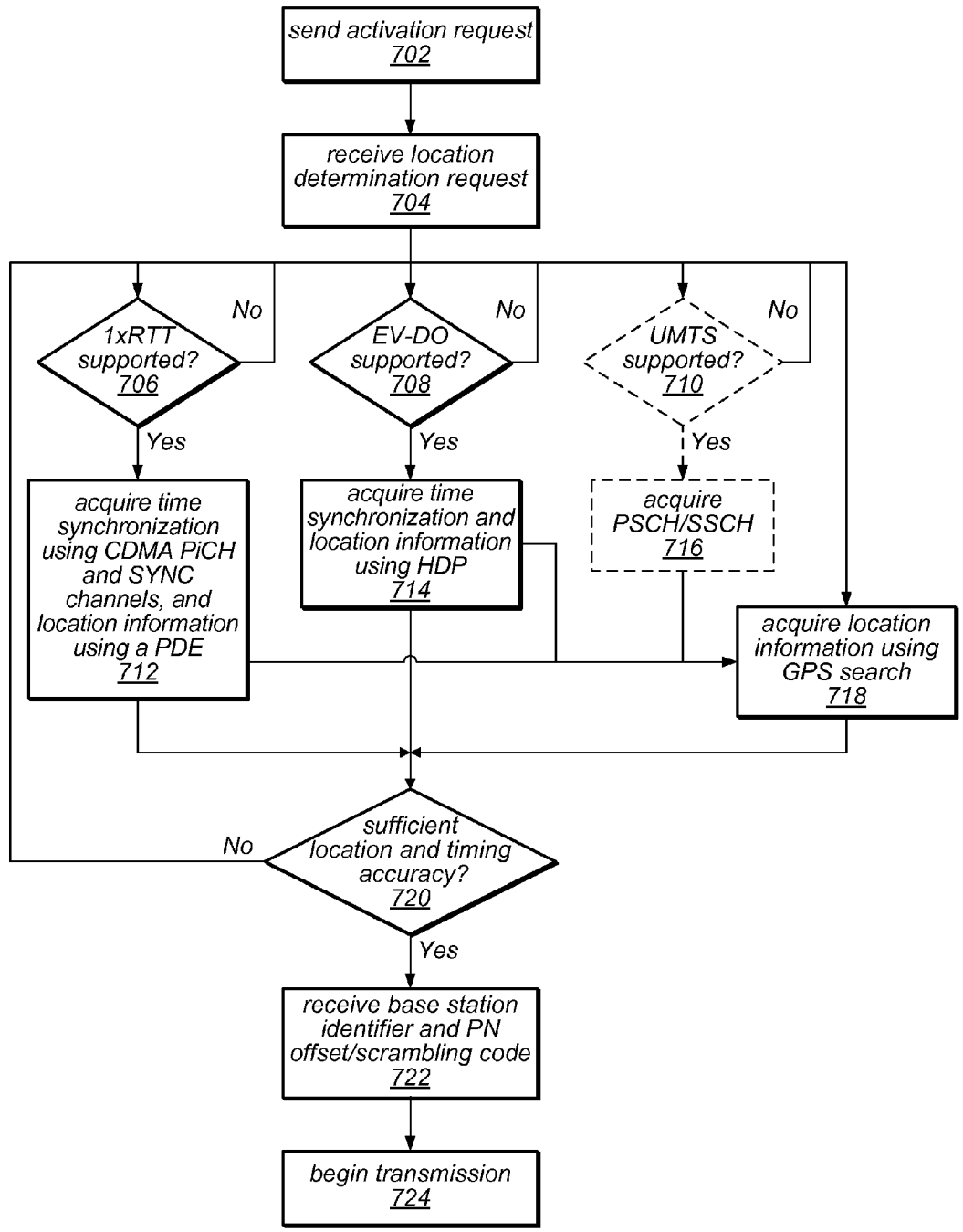
FIG. 7 is a flowchart of an exemplary method for acquiring time synchronization and location information, according to one embodiment.
Figure 8:
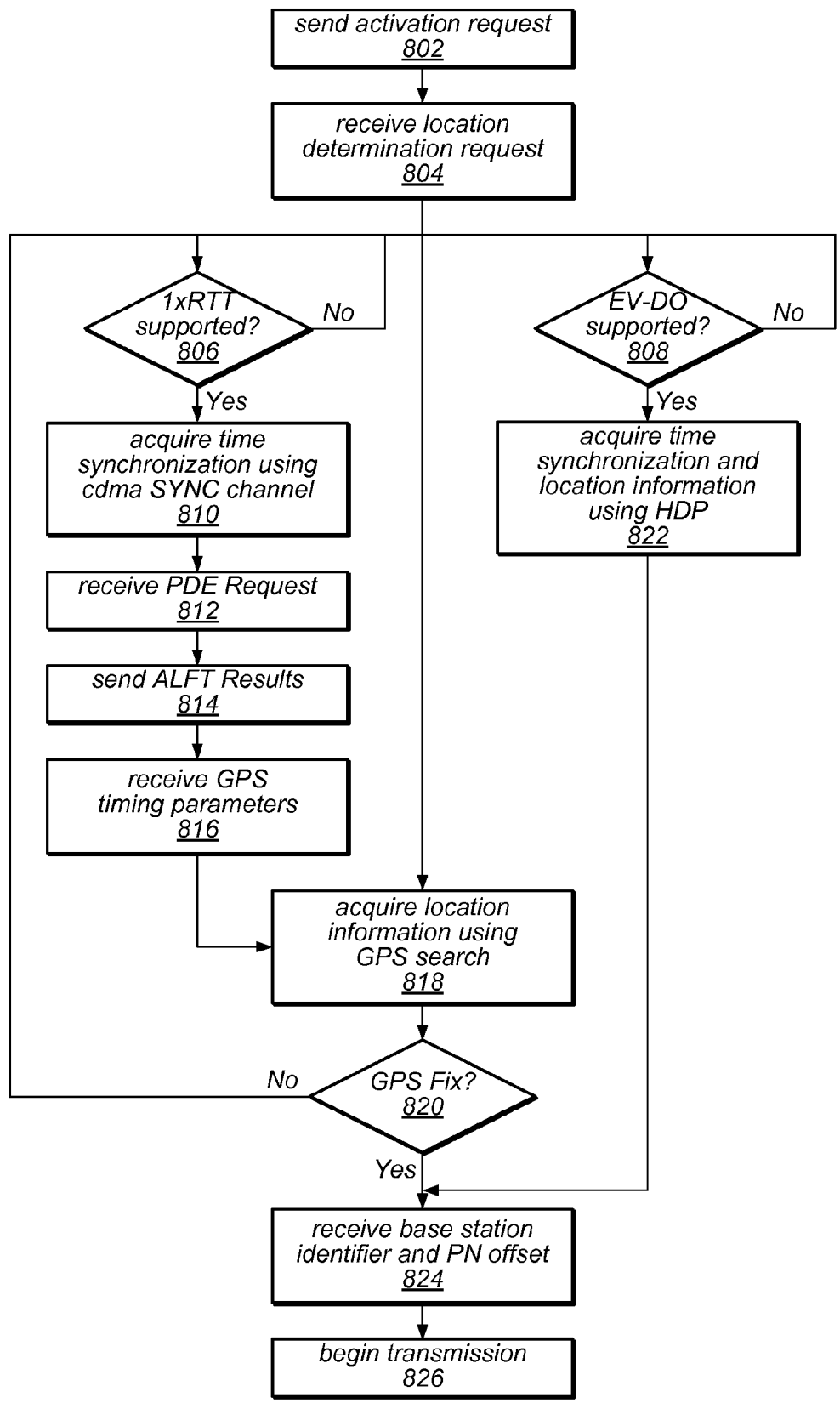
FIG. 8 is a flowchart of an exemplary method for acquiring time synchronization and location information, according to one embodiment.

FIGS. 7-8—Method for Acquiring Time Synchronization and Location Information with an Access Point Base Station FIG. 7 illustrates an exemplary method for acquiring a time synchronization and location information with an access point base station. In one embodiment, the method shown in FIG. 7 may be utilized in systems implementing the CDMA 2000 and/or UMTS protocols. The method of FIG. 7 may be used in conjunction with the method shown in FIG. 4 and with any of the computer systems or devices shown in the above Figures, or any other appropriate device. In various embodiments, some of the method elements shown may be performed in parallel (or substantially parallel), performed in a different order than shown, or omitted. For example, in some embodiments, a system may employ the CDMA 2000 protocol but not the UMTS protocol, so 710 and 716 may be omitted as indicated by the dotted lines. Similarly, additional method elements may also be performed as desired. As used herein "parallel" may refer to at least two procedures being performed concurrently. More specifically, when procedures are executed in parallel, at least a portion of the execution of each procedure may overlap. In the following description, references to the "access point base station" refer to the access point base station 120.

In 702, the access point base station may transmit an activation request to the service provider (e.g., as in 404). As mentioned above, the access point base station may send the request over a wired broadband connection to the service provider. Alternatively, the access point base station may send the request to the service provider via a wireless connection. In some embodiments, the access point base station may also send various parameters that indicate its various capabilities. In one embodiment, the access point base station may additionally send an access point base station identifier.

In 704, the access point base station may receive a location determination request in which the service provider requests the location of the access point base station. In some embodiments, the access point base station may also receive various network parameters such as, for example, a service identifier (SID), network identifier (NID), frequency assignment, etc. These parameters may also indicate various capabilities of the network such as, for example, support for 1xRTT, EV-DO, highly detectable pilot (HDP) availability, etc. In one embodiment, if the location of the access point base station is roughly known within the macro environment, the access point base station may receive a list of neighboring macro base stations.

In 706, 708 and 710, the access point base station may determine whether 1xRTT, EV-DO, and UMTS are supported. Depending on the various capabilities of the access point base station and the network, the access point base station may perform a first plurality of procedures to acquire a time synchronization and a second plurality of procedures to acquire a location of the access point base station. As described in greater detail below, in some embodiments, the first plurality of procedures may include the use of a CDMA SYNC channel, HDP, PSCH and SSCH channels, etc. The second plurality of procedures may include the use of a PDE (position determination entity) request, HDP, GPS, etc. In various embodiments, the access point base station may perform the first plurality of procedures and the second plurality of procedures in parallel (or substantially parallel). For example, the access point base station may perform a GPS search while also using HDP. In some embodiments, various procedures may be included in both the first and second plurality of procedures (e.g., use of HDP).

In 712, if 1xRTT is supported, the access point base station may acquire a time synchronization using CDMA PiCH and SYNC channels, and location information using a position determination entity (PDE). In one embodiment, the access point base station may search for the strongest neighboring macro base station. Then, the access point may tune its receive frequency (Rx) to the transmission frequency (Tx) of the neighboring macro base station, and decode the PiCH and SYNC channels to obtain precise timing information. In various embodiments, the access point base station may also send a position determination entity (PDE) request using IS-801 protocol to the neighboring macro base to acquire the location of the access point base station. In some embodiments, the obtained information from this IS801 session with the PDE may be used to aid other procedure in acquiring more accurate location information. For example, initially the PDE may know the location of the access point base station only down to the radius of the cell tower that the access point base station is receiving (e.g. ~5 km depending on radius of cell tower). As a result, more accurate procedures for acquiring location information may be performed such as, for example, AFLT (<5 km, depending on number of neighboring BS seen) or GPS (~<100 m, depending on number of satellites found) as described in 718 below.

In 714, if EV-DO is supported, the access point base station may acquire a time synchronization and location information using the highly detectable pilot (HDP) protocol. In one embodiment, the access point base station may search for the strongest neighboring macro base station. Then, the access point base station may adjust its time and determine its location according to the procedures of HDP. In some embodiments, the information provided by HDP may be similar to that provided by AFLT in a CDMA 1x system. In various embodiments, this location information may be used to assist the GPS search in 718 described below.

In 716, if UMTS is supported, the access point base station may acquire a primary synchronization channel (PSCH) and a secondary synchronization channel SSCH in order to acquire a time synchronization. In some embodiments, the access point base station may perform slot and frame boundary synchronization with the PSCH and SSCH. In various embodiments, time information determined from the acquired time synchronization may be used in 718 to determine which satellites to search.

In 718, the access point base station may acquire location information using a GPS search. For example, in some embodiments, the access point base station may employ an assisted GPS (AGPS) search, in which an initial location is acquired using another procedure (e.g., a PDE request or HDP) and used by the GPS to determine a more specific location.

In 720, the access point base station may determine whether the location information and timing accuracy are sufficient. If the location information and timing accuracy are not sufficient (e.g., no service is available or connection with the service provider is lost), the access point base station may reacquire time synchronization and/or the location information (e.g., the method of FIG. 7 may return to 706, 708, 710, and 718). On the other hand, if the location information and timing accuracy are sufficient, the access point base station may transmit the location information to the service provider. In one embodiment, the location information may include the latitude and longitude of the access point base station. In other embodiments, the location information may include trilateration information. In some embodiments, the location information may include a location relative to other access point base stations or neighboring macro base stations.

In 722, the access point base station may receive a base station identifier and a PN offset assignment or a scrambling code assignment from the service provider. In various embodiments, the base station identifier and/or PN offset/scrambling code may be assigned based at least on the transmitted location of the access point base station in order to control/mitigate intra-cell interference and to simplify acquisition/synchronization procedures while reducing terminal complexity. In some embodiments, the access point base station may receive other information, from the service provider, that is also dependent on the transmitted location, such as, for example, various ones of the second information described above in 410—power parameters, an admission policy, a list of acceptable terminals capable of using the access point base station, handoff parameters, etc.

In 724, the access point base station may begin transmission using the received information provided in 722. In various embodiments, the access point base station may periodically adjust its timing and verify its location in response to a periodic timer.

FIG. 8 illustrates an exemplary method for acquiring a time synchronization and location information with an access point base station. In one embodiment, the method shown FIG. 8 may be utilized in systems implementing the CDMA 2000 protocol. The method may be used in conjunction with the method shown in FIG. 4 and with any of the computer systems or devices shown in the above Figures, or any other appropriate device. In various embodiments, some of the method elements shown may be performed in parallel (or substantially parallel), performed in a different order than shown, or omitted. Additional method elements may also be performed as desired.

In 802, the access point base station sends an activation request to the service provider as in 702 above.

In 804, the access point base station receives a location determination request as in 704 above. In some embodiments, the access point base station may also receive various network parameters and a list of neighboring macro base stations.

In 806 and 808, the access point base station may determine whether 1xRTT and EV-DO are supported. As described above, the access point base station may perform a first plurality of procedures to acquire a time synchronization and a second plurality of procedures to acquire a location of the access point base station, depending on the supported protocols. In some embodiments, the first plurality of procedures may include the use of a CDMA SYNC channel, HDP, etc. The second plurality of procedures may include the use of a PDE request, ALFT, GPS, etc.

In 810, if 1xRTT is supported, the access point base station may acquire a time synchronization using a CDMA SYNC channel. In one embodiment, the access point base station may search for the strongest neighboring macro base station. Then, the access point may tune its receive frequency (Rx) to the transmission frequency (Tx) of the neighboring macro base station, and decode the SYNC channel in order to acquire a time synchronization.

In 812, the access point base station receives a PDE request from a neighboring macro base station of the service provider. In one embodiment, the PDE request may be compatible with the IS-801 protocol.

In 814, the access point base station may send the advanced forward link trilateration (ALFT) results to the macro base station so that it can obtain an initial position fix for the access point base station to reduce the GPS search window.

In 816, the access point base station may receive various corresponding GPS timing parameters such as, for example, the search window size, ephemeris, etc.

In 818, the access point base station may acquire location information using a GPS search. As shown FIG. 8, the access point base station, in some embodiments, may use the GPS timing parameters received in 816 to further assist the GPS search.

In 820, the access point base station determines whether the GPS search has acquired an accurate fix. If an accurate fix is not acquired, the access point base station may continue the GPS search in 818 and perform 806-816 again in order to receive new GPS timing parameters. On the other hand, if an accurate fix is acquired, the access point base station may determine its location and provide this location information to the service provider.

In 822, if EV-DO is supported, the access point base station may acquire a time synchronization and location information using HDP, and provide the location information to the service provider.

In 824, the access point base station may receive a base station identifier and a PN offset assignment. As in 722, the service provider may assign the base station identifier and PN offset based on at least the location of the access point base station. In various embodiments, the access point base station may receive additional information such as described in 410.

In 826, the access point base station may begin transmission using the information received as in 724.

It is noted that while FIGS. 7-8 describe specific procedures for acquire a time synchronization and location information, other procedures may used, as desired. For example, in some embodiments, the access point base station may use other procedures that use trilateration and/or the global positing system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
   an access point base station automatically conveying an activation request to a service provider through a wired connection, wherein the service provider provides wireless communication in a macro area, and wherein the access point base station provides wireless communication in a local area, and wherein said automatically conveying is performed without receiving user input requesting transmission of the activation request;
   the access point base station performing a first plurality of procedures to acquire a time synchronization, wherein the first plurality of procedures comprises at least employing a CDMA channel and highly detectable pilot protocol, in parallel;
   the access point base station performing a second plurality of procedures to acquire a location of the access point base station, wherein the second plurality of procedures comprises at least employing a position determination entity request and the highly detectable pilot protocol, in parallel;
   the access point base station conveying the acquired location to the service provider; and
   the access point base station initially determining a change in a corresponding wireless network, and reporting the change to the service provider prior to receiving updated operational parameters.

2. The method of claim 1, wherein the access point base station is a femtocell, and wherein the access point base station performs some of the first and second pluralities of procedures in parallel.

3. The method of claim 1, wherein one of the first plurality of procedures is included in the second plurality of procedures.

4. The method of claim 1, wherein performing the second plurality of procedures includes:
   acquiring an initial location; and
   in response to the initial location, acquiring a specific location using some of the second plurality of procedures.

5. The method of claim 1, further comprising:
   receiving information from the service provider, wherein the received information is determined based on at least the acquired location.

6. The method of claim 5, wherein the received information includes a base station identifier.

7. The method of claim 5, wherein the received information includes one or more power parameters and an assigned pseudorandom number (PN) offset or an assigned scrambling code.

8. The method of claim 1, wherein the change in the a corresponding wireless network comprises addition or removal of access point base stations.

9. The method of claim 1, wherein the second plurality of procedures futher comprises employing global positioning system (GPS).

10. A femtocell, comprising:
    at least one wireless port for providing bi-directional communication with one or more access terminals, wherein the at least one wireless port is usable in providing wireless communication in a local area;
    a first port for providing bi-directional communication with a service provider over an IP network;
    a processor coupled to the at least one wireless port and the first port;
    a memory medium coupled to the processor, wherein the memory medium comprises program instructions executable to:
      automatically convey an activation request to a service provider through a wired connection, wherein said automatically conveying is performed without receiving user input requesting transmission of the activation request;
      perform a first plurality of procedures to acquire a time synchronization, wherein the first plurality of procedures comprises at least employing a CDMA channel and highly detectable pilot protocol, in parallel;
      perform a second plurality of procedures to acquire a location of the access point base station, wherein the second plurity of procedures comprises at least employing a position determination entity request and highly detectable pilot protocol, in parallel;
      convey the acquired location to the service provider; and
      initially determine a change in a corresponding wireless network, and report the change to the service provider prior to receiving updated operational parameters.

11. The femtocell of claim 10, wherein the program instructions are further executable to perform the first and second pluralities of procedures in parallel.

12. The femtocell of claim 10, wherein one of the first plurality of procedures is included in the second plurality of procedures.

13. The femtocell of claim 10, wherein the program instructions are further executable to:
    acquire an initial location; and
    in response to the initial location, acquire a specific location using some of the second plurality of procedures.

14. The femtocell of claim 10, wherein the program instructions are further executable to receive information from the service provider, wherein the received information is determined based on at least the acquired location, and wherein the received information includes an assigned pseudorandom number (PN) offset or an assigned scrambling code.

15. The femtocell of claim 10, wherein the change in the a corresponding wireless network comprises addition or removal of access point base stations.

16. The femtocell of claim 10, wherein the second plurality of procedures futher comprises employing a global positioning system (GPS).

17. A method comprising:
  receiving an activation request from an access point base station to a service provider through a wired connection, wherein the service provider provides wireless communication in a macro area, the access point base station provides wireless communication in a local area, and wherein the activation request was automatically transmitted by the access point base station without receiving user input requesting transmission of the activation request;
  receiving a location of the access point base station, wherein the access point base station performs a first plurality of procedures to acquire a time synchronization and a second plurality of procedures to acquire the received location, and wherein the first plurality of procedures comprises at least employing a CDMA channel and highly detectable pilot protocol, in parallel and wherein the second plurality of procedures comprises at least employing a position determination entity request and the highly detectable pilot protocol, in parallel; and
  receiving a report from the access point base station indicating a change in a corresponding wireless network, wherein the change is initially determined by the access point base station and is reported prior to the access point base station receiving updated operational parameters.

18. The method of claim 17, further comprising the service provider assigning a pseudorandom number (PN) offset or a scrambling code to the access point base station based on at least the received location.

19. The method of claim 17, further comprising the service provider assigning a base station identifier to the access point base station based on at least the received location.

20. The method of claim 17, further comprising the service provider conveying a list of neighboring macro base stations to the access point base station.

21. A method comprising:
  an access point base station conveying an activation request from an access point base station to a service provider through a wireless connection, wherein the service provider provides wireless communication in a macro area, and wherein the access point base station provides wireless communication in a local area;
  the access point base station performing a first plurality of procedures to acquire a time synchronization, wherein the first plurality of procedures comprises at least employing a CDMA channel and highly detectable pilot protocol, in parallel;
  the access point base station performing a second plurality of procedures to acquire a location of the access point base station, wherein the second plurality of procedures comprises at least employing a position determination entity request and the highly detectable pilot protocol, in parallel;
  the access point base station conveying the acquired location to the service provider; and
  the access point base station initially determining a change in a corresponding wireless network, and reporting the change to the service provider prior to receiving updated operational parameters.

22. A method comprising:
  automatically configuring an access point base station without requiring a user to manually configured the access point base station, said automatically configuring comprising:
    the access point base station automatically conveying an activation request to a service provider through a wired connection, wherein the service provider provides wireless communication in a macro area, and wherein the access point base station provides wireless communication in a local area;
    the access point base station performing a first plurality of procedures to acquire a time synchronization, wherein the first plurality of procedures comprises at least employing a CDMA channel and highly detectable pilot protocol, in parallel;
    the access point base station performing a second plurality of procedures to acquire a location of the access point base station, wherein the second plurality of procedures comprises at least employing a position determination entity request and the highly detectable pilot protocol, in parallel; and
    the access point base station conveying the acquired location to the service provider.

* * * * *

UNITED STATES PATENT AND TRADEMARK OFFICE
CERTIFICATE OF CORRECTION

PATENT NO.         : 8,937,936 B2
APPLICATION NO.    : 12/463798
DATED              : January 20, 2015
INVENTOR(S)        : Stanislaw Czaja et al.

It is certified that error appears in the above-identified patent and that said Letters Patent is hereby corrected as shown below:

Title Page, should read, (73) Assignee:   VIA Telecom, Inc., San Diego, CA
                                                                   IPComm, Cardiff, CA
                                                                   LG Electronics, Inc., Seoul, Korea Signed and Sealed this
Sixth Day of October, 2015

Michelle K. Lee
*Director of the United States Patent and Trademark Office*